Aug. 31, 1965  G. DETTWILER  3,203,406
ROTARY ENGINE
Filed Nov. 28, 1960  8 Sheets-Sheet 3
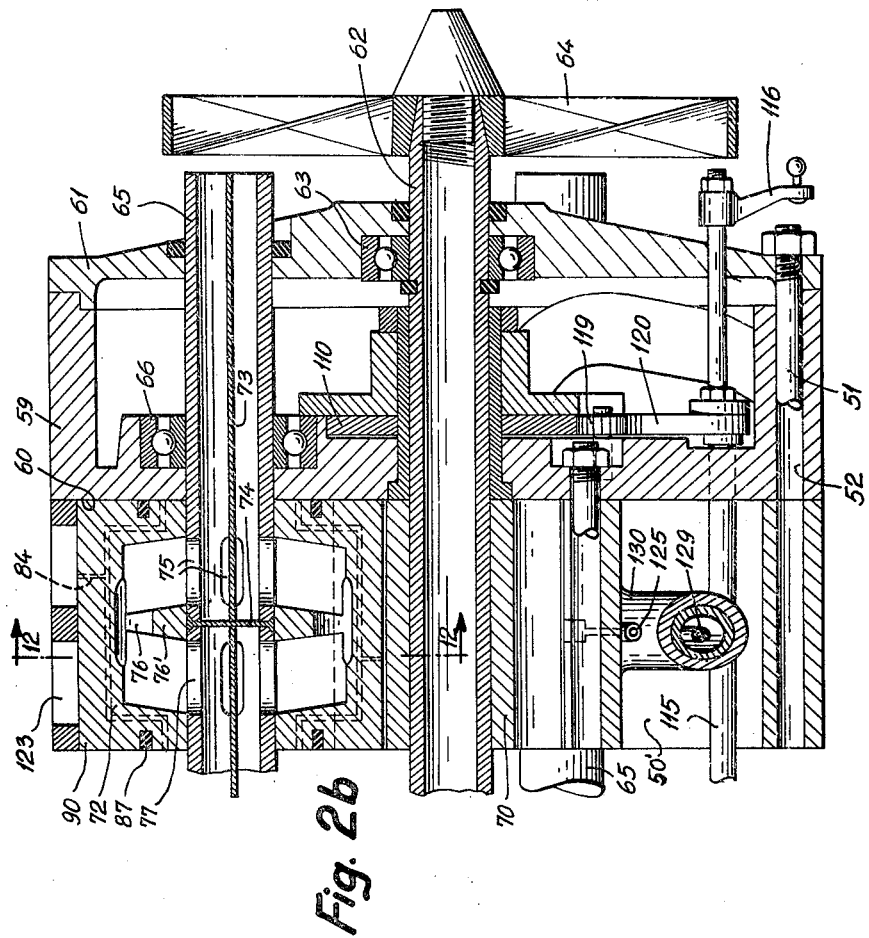
Fig. 2b
INVENTOR
Georges DETTWILER
BY Pierre Lespérance
PATENT AGENT Aug. 31, 1965     G. DETTWILER     3,203,406
ROTARY ENGINE Filed Nov. 28, 1960     8 Sheets-Sheet 4

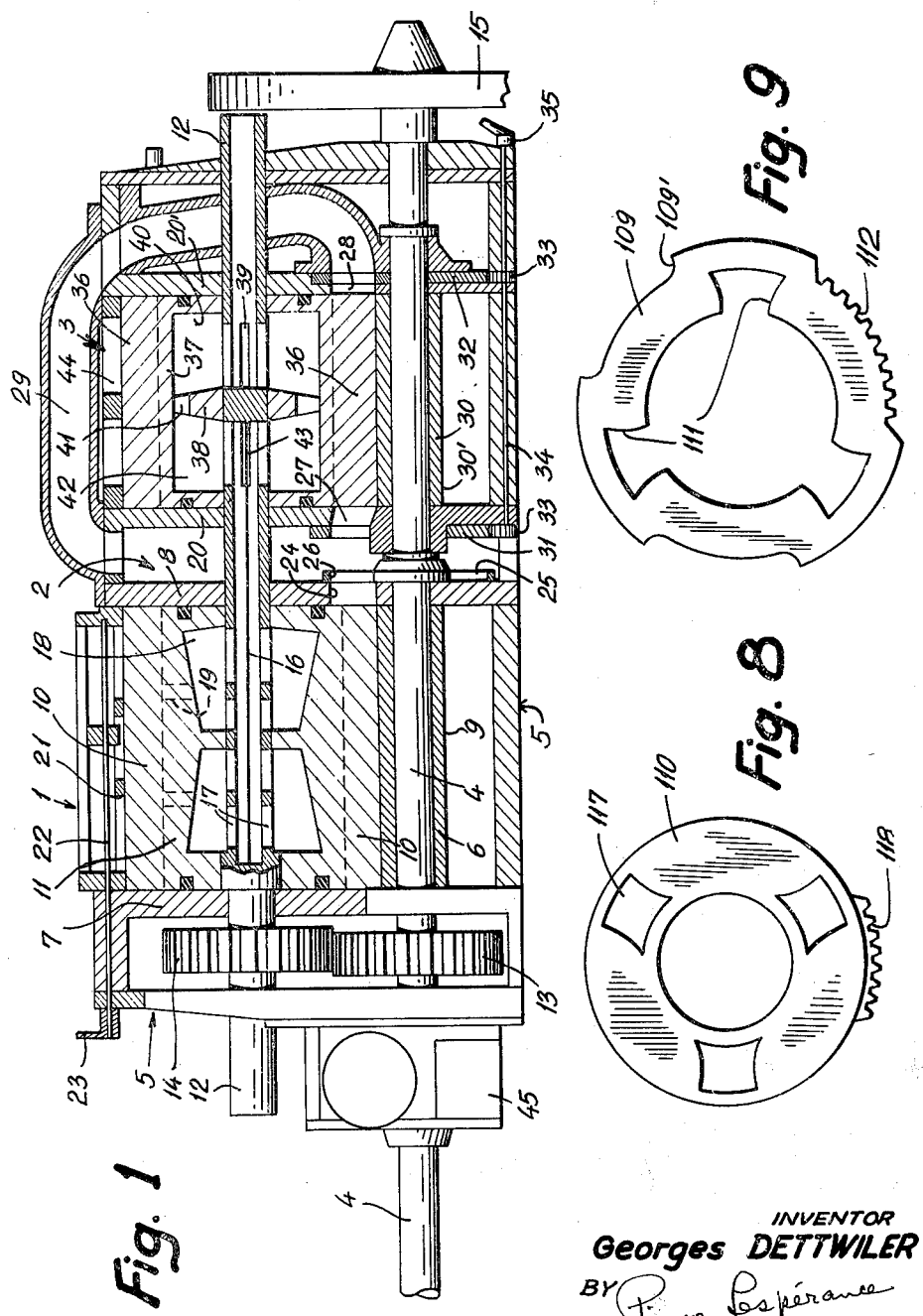

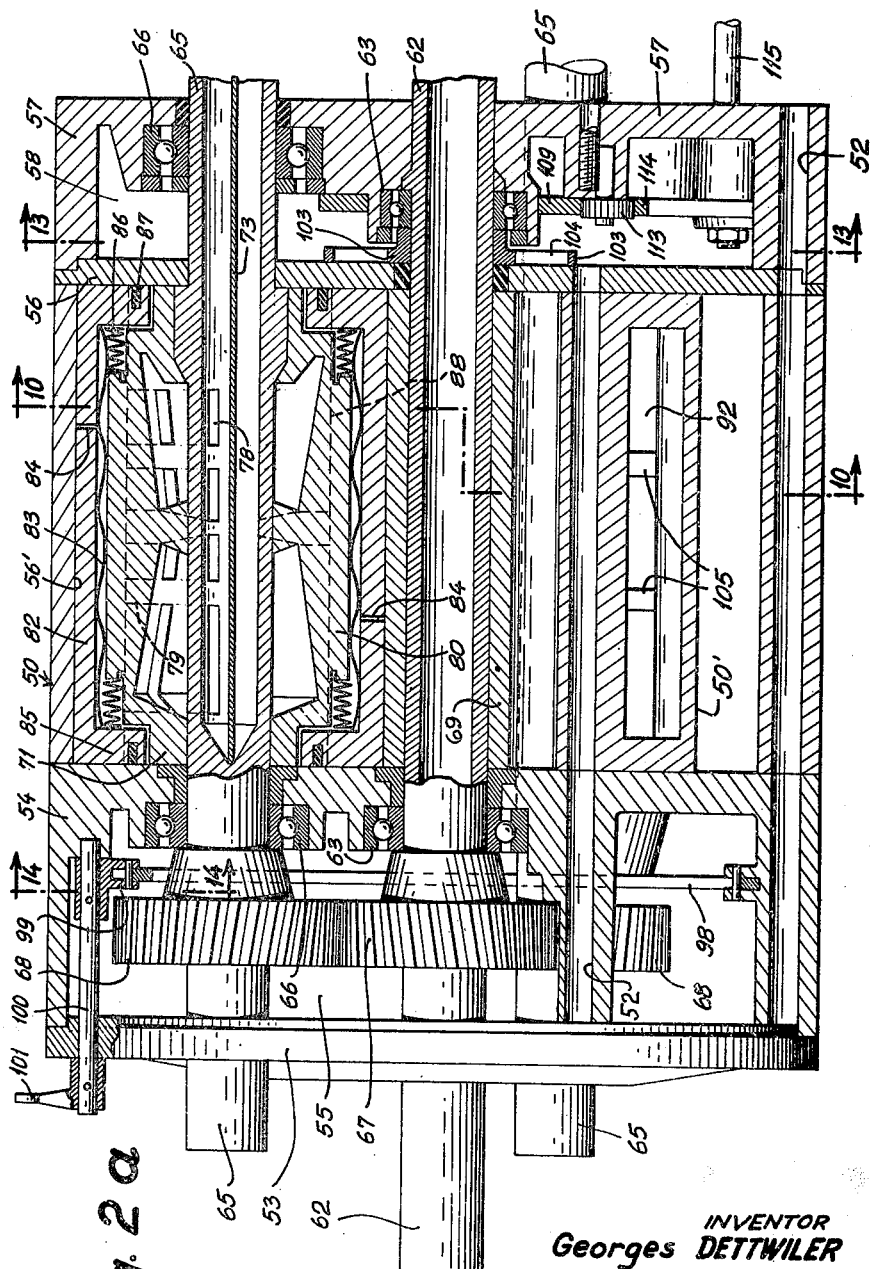

INVENTOR
Georges DETTWILER
BY Pierre Lesperance
PATENT AGENT

Aug. 31, 1965  G. DETTWILER  3,203,406
ROTARY ENGINE
Filed Nov. 28, 1960  8 Sheets-Sheet 6

INVENTOR
Georges DETTWILER
BY
Pierre Lesperance
PATENT AGENT

Aug. 31, 1965   G. DETTWILER   3,203,406
ROTARY ENGINE

Filed Nov. 28, 1960   8 Sheets-Sheet 7

INVENTOR
Georges DETTWILER
BY
Pierre Lesperance

PATENT AGENT

INVENTOR
Georges DETTWILER
BY Pierre Lespérance
PATENT AGENT

United States Patent Office 3,203,406
Patented Aug. 31, 1965

3,203,406
ROTARY ENGINE
Georges Dettwiler, 12405 Jasmin St., Cartierville,
Montreal, Quebec, Canada
Filed Nov. 28, 1960, Ser. No. 72,096
4 Claims. (Cl. 123—13)

The present invention relates to a rotary internal combustion engine in which all the movable parts have a continuous rotational movement thereby eliminating power loss due to alternating movement of certain parts in conventional engines.

Another object of the invention resides in the provision of a rotary engine of the character described having a high power output compared to its size and which is capable of a great range of speed from about low speed of 80 r.p.m. up to 30,000 r.p.m. and more and which has a high compression ratio and is capable of rapid acceleration.

Other objects of the present invention reside in the provision of an engine of the character described which has a minimum of friction and in which good sealing of the relatively movable parts is effected and power loss is reduced to a minimum and which has very simple means for igniting the explosive mixture.

Another object of the invention resides in the provision of a rotary engine of the character described in which the combustion air is compressed in a separate compressor and thereafter stored in a storing chamber to be delivered at high uniform pressure to the motor proper resulting in a high power output.

Another object of the invention resides in the provision of an engine of the character described which can be fed with various types of fuel, such as gasoline, fuel oil, wood alcohol, natural gas, acetylene gas, and the like.

Still another object of the invention resides in the provision of an engine of the character described which is of relatively simple and inexpensive construction, and which runs with a minimum of upkeep and servicing.

The foregoing and other important objects of the present invention will become more apparent during the following disclosure and by referring to the drawings in which:

FIGURE 1 is a longitudinal vertical section of a first simplified embodiment;

FIGURE 2a is a longitudinal vertical section of a four rotor engine showing the compressor unit and storage compartment;

FIGURE 2b is a section which is a continuation of FIGURE 2a and showing the motor unit;

FIGURE 8 is an elevation of the disk valve for the inlet port of the motor unit at the outer end thereof;

FIGURE 9 is an elevation of the disk valve for the inlet port of the motor at the inner end of said motor adjacent the storage chamber;

FIGURE 10 is a cross-section along line 10—10 of FIGURE 2a;

FIGURE 13 is a cross-section along line 13—13 of FIGURE 2a;

FIGURE 14 is a cross-section along line 14—14 of FIGURE 2a;

In the drawings, like reference characters indicate like elements throughout.

Figure 3:
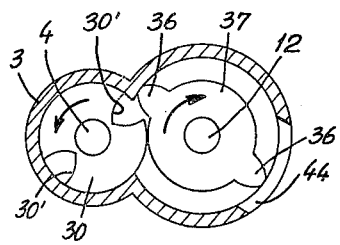
FIGURES 3 to 6 are cross-sections of various arrangements showing different numbers of rotors.

The engine illustrated in FIGURE 1 and corresponding to the rotor arrangement of FIGURE 3 will first be described. This embodiment comprises a compressor unit 1, a compressed air storage chamber 2 and a motor unit 3 all disposed in housing 5. The compressor unit 1 and motor unit 3 have each a single sealing rotor and a single toothed rotor respectively mounted on a common shaft for the two units. The lower output shaft 4 is journalled in the housing 5 and extends through the same. A compressor sealing rotor 6 is keyed to shaft 4 and extends within the compressor chamber defined by partitions 7 and 8. The sealing rotor 6 has two diametrically opposed longitudinally extending notches or cavities 9, which are adapted to successively receive the diametrically opposed teeth 10 of the toothed rotor 11 of the compressor unit 1. Rotors 6 and 11 are similar to toothed rotor 37 and sealing rotor 30 of the motor unit 3 shown in FIGURE 3. The rotor 11 is keyed to an auxiliary or satellite shaft 12 journalled in housing 5, extending therethrough and parallel to main or output shaft 4. The cylindrical surfaces of rotors 6 and 11 are in direct contact and effect a seal at the line of contact. The two rotors 6 and 11 have the same diameter and are rotated at the same speed to have equal peripheral speed, through gears 13 and 14 respectively secured to the shafts 4 and 12 and disposed within housing 5 outside of the compressor compartment.

In the position shown in FIGURE 1, the teeth 10 of the rotor 11 are disposed in a vertical plane and the lower tooth is therefore in engagement with the upper notch of the sealing rotor 6, while the lower notch is empty, as shown.

The satellite shaft 12 is hollow and opens at the front end of the motor, so that air circulated by the fan 15 rotated by the main shaft 4 is fed to auxiliary shaft 12. This air is divided into two streams within shaft 12 by means of longitudinally extending partition 16. Thus, in the region of the toothed rotor 11, air enters through slots 17 made in the shaft 12, into the hollow chamber 18 of the hollow rotor 11, so as to cool the rotor. This air can also be fed by passages 19 made in rotor 11 directly into the compression chamber at the downstream side of the teeth 10. Thus, a limited amount of air may be fed through shaft 12 into the compressor to be compressed thereby. This is sufficient at the start of the engine, for slow rotation of the rotors. However, the main quantity of air is supplied to the compressor unit from an inlet port 21 which extends the whole length of the compressor unit and opens to the exterior of the housing 5 and directly into the compression chamber. This port 21 is controlled by a butterfly valve 22 manually actuated by knob 23. Once the engine is started, valve 22 is fully opened by knob 23.

Air compressed by the compressor unit is dischargd through port 24 made in partition 8 into the storage chamber 2 defined between partition 8 and partition 20 of the housing 5. Return flow of the compressed air within storage chamber 2 back into the compressor unit is prevented by a rotary valve disk 25 keyed to main shaft 4 and in sliding contact with partition 8 opposite discharge port 24. Disk 25 has a segmental opening 26 adapted to register with port 24. Disk 25 thus cyclically opens and closes the port 24.

The air compressed in storage chamber 2 is fed to the opposite sides of the motor unit 3 by entering unit 3 through opposite ports 27 and 28 made in partitions 20 and 20′ respectively. Air from storage chamber 2 is fed to port 28 through duct 29, which also serves as an extension of the storage chamber 2 for the compressed air. Ports 27 and 28 open within the motor chamber defined by partitions 20 and 20′ and opposite the sealing rotor 30 of the motor which is secured to the output shaft 4. The ports 27 and 28 have their effective area adjusted from a completely closed state to a completely opened state by means of angularly adjustable controlling disk valves 31 and 32 respectively, and having a shape similar to that of FIGURES 9 and 8 respectively with the difference that they have only one trapezoidal opening or slot adapted to register with the respective port 27 and 28. These two disks 31 and 32 have rack teeth meshing with pinions 33 mounted on a common shaft 34 which is manually rotatable by knob 35.

The sealing rotor 30 of the motor unit is similar in construction to the sealing rotor 6 of the compressor unit having two diametrically opposed grooves or notches 30′ (see FIGURE 3) engageable with the diametrically opposed teeth 36 of the toothed rotor 37 of the motor, said toothed rotor 37 being keyed to the satellite shaft 12. Rotor 37 is of hollow construction with central supporting web 38 which extends through the shaft 12 whereby the air circulating in the shaft will first have to pass through slot 39 into chamber 40, then through web holes 41 into chamber 42, and then through slots 43 to continue through the shaft towards the toothed rotor 11 of the compressor unit. Thus, air circulating in chambers 40 and 42 cools the toothed rotor 37.

The motor unit is supplied with fuel from a fuel injection system and has an ignition system to be described hereinafter; the compressed air enters the motor chamber through ports 27 and 28, then fuel is injected and thereafter ignited to rotate the rotor 37 and the exhaust gases are discharged through lateral exhaust port 44. The fuel injection pump and other accessories are located in a box 45 and at one end of the engine and driven by the output shaft 4. The engine is started either by a starting motor or preferably by a source of compressed air fed to the motor unit, as will be described later on. For starting, the disk valves 31 and 32 are closed whereby air pressure is built up within the storage chamber 2 by means of the compressor unit. Then the disk valves 31 and 32 are gradually opened by actuating knob 35, whereby the motor unit runs normally and in turn drives the compressor unit.

From the foregoing, it is seen that air is first compressed in a separate compressor unit, then stored in a storage chamber at a substantially constant high pressure to be fed to both sides of the motor unit under initial high compression and wherein it is mixed with fuel and the mixture ignited. Energy can be extracted through shaft 4, but is preferably extracted from satellite shaft 12.

Details of construction and operation of the embodiment just described will be further amplified in conjunction with a four rotor arrangement illustrated in more detail.

Figure 4:
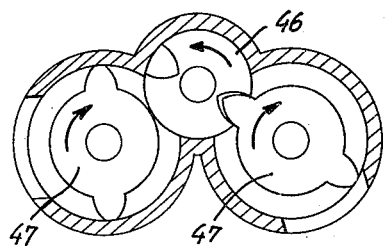
Figure 6:
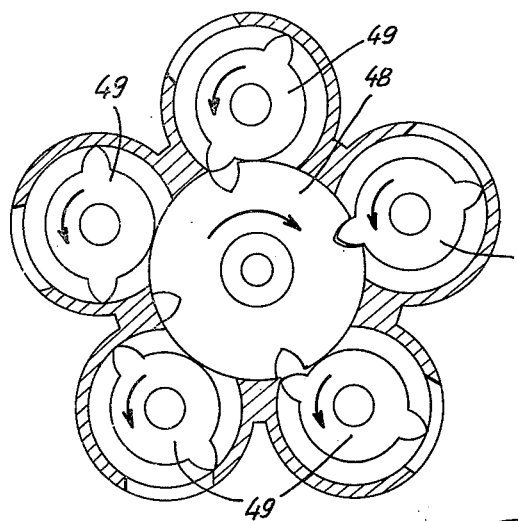
Figure 5:
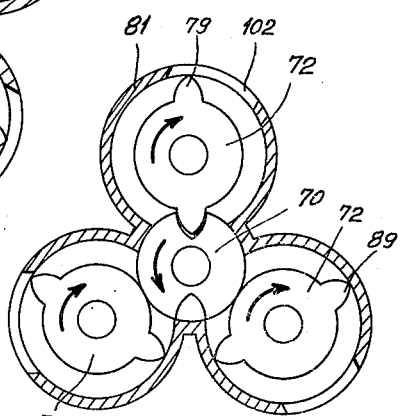

However, referring to FIGURES 4 to 6, it is seen that using the same principles, engines having a varying number of toothed rotors may be provided in accordance with the present invention, all having a single set of sealing rotors common to all the toothed rotors.

FIGURE 4 shows a single sealing rotor 46 meshing with two toothed rotors 47.

FIGURE 6 shows a single centrally located sealing rotor 48 common to and in meshing engagement with five satellite toothed rotors 49.

FIGURE 5 shows the arrangement of a single centrally located sealing rotor with three satellite toothed rotors. This is the embodiment which will now be described in more details.

FIGURES 2a and 2b show a longitudinal section taken along a vertical plane of the entire engine in accordance with the arrangement of FIGURE 5.

Figure 10:
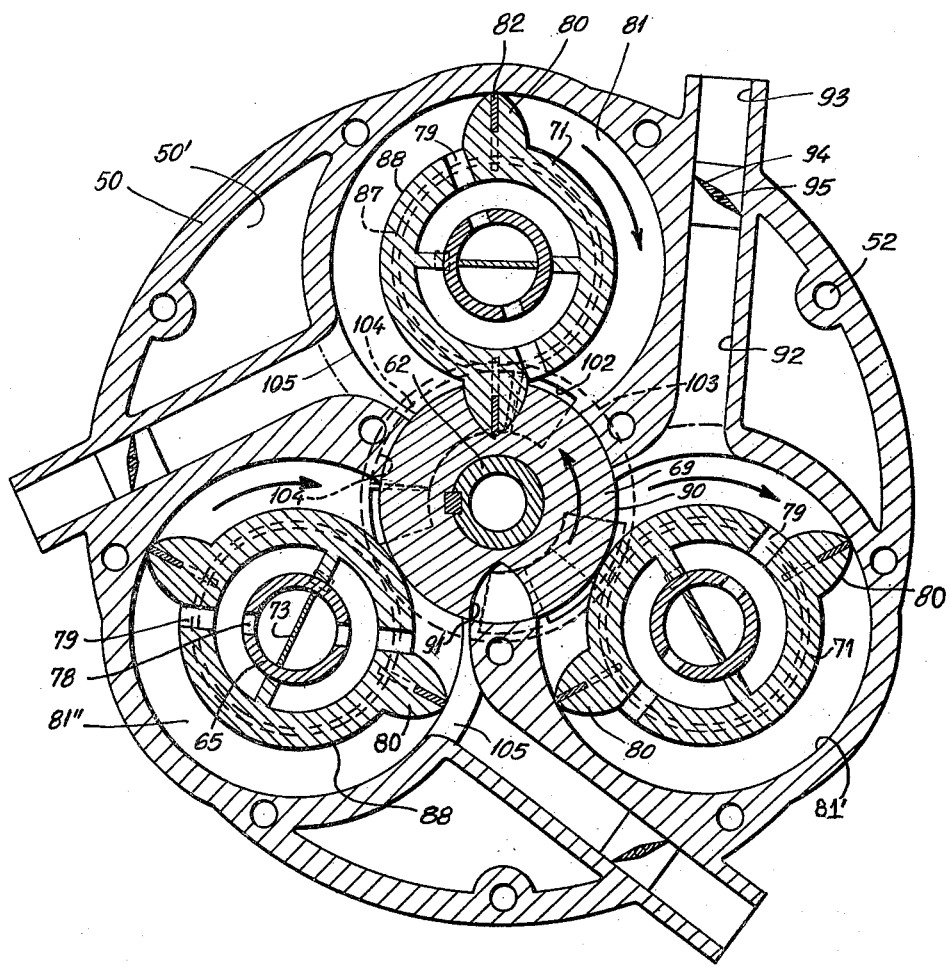

The engine housing 50 has a generally cylindrical shape and consists of housing elements assembled in end to end relationship by means of tie rods 51 passing through holes 52 made in the various housing elements (see also FIGURE 10). The housing elements comprise, starting from the rear end of the motor, a circular cap 53 closing a flanged partition 54 to define a gear chamber 55. Partition 54 together with partition 56 define between themselves the compressor compartment 56′. Partition 56 with flanged partition 57 define the air storage compartment or chamber 58. Partition 57 and flanged partition 59 define the motor compartment 60. Flanged partition 59 together with cap 61 define a front chamber for various elements of the engine.

A centrally disposed main shaft 62 extends throughout the length of housing 50 and is journalled in bearings 63; the front end of shaft 62 is provided with a fan 64 adapted to feed air into the three hollow satellite shafts 65 which also extend through housing 50 and are journalled in bearings 66 being parallel to main shaft 62, and equally angularly spaced around the same in a circle coaxial with shaft 62 (see FIGURE 10). All the shafts are positively drivingly interconnected by means of gear wheels 67 and 68, keyed to the respective shafts and located at the rear end of the engine within gear chamber 55. On main shaft 62 are keyed the sealing rotor 69 for the compressor unit, and the sealing rotor 70 for the motor unit (see FIGURES 2a, 2b, and 10 and 12). On each satellite shaft 65 are keyed a toothed rotor 71 for the compressor unit and a toothed rotor 72 for the motor unit.

As shown in FIGURES 2a, 2b and 10, the satellite shafts 65 are hollow and open at the front end of the engine opposite fan 64 and are provided with a longitudinally extending partition 73 to thereby define two separate conduits which are closed in the middle of the motor rotor 72 by a cross partition 74. Air fed within shafts 65 by fan 64 circulates through the front end of the shafts, then through slots 75 into the hollow interior of the motor rotor 72, then through holes 76 to the other side of web 76′ of the rotor, back into the shaft 65 through slots 77 whereby air circulating through the hollow rotor 72 cools the same. The air then enters the compressor rotor 71 through slots 78 made in the shaft 65 circulates in the interior of the hollow rotor 71 and finally is discharged at the periphery of said rotor through bores 79 (see FIGURE 10) disposed adjacent to and downstream from the diametrically opposed teeth 80 of the compressor rotor 71.

As shown in FIGURE 10, each of the three satellite compressor rotors 71 rotates within a cylindrical compression chamber or cylinder 81, 81′ and 81″, with its teeth 80 in sliding contact with the internal surface of the wall of said chamber. Good sealing is achieved between the teeth 80 and the cylinder 81, 81′, or 81″ by means of a sealing blade 82 slidably mounted within a longitudinal groove made in each tooth 80 and spring pressed radially outwardly by a wave-like spring 83 (see FIGURE 2a) in the bottom of the groove. The sealing blade 82 is in two separate parts, as shown at 84, and has right angular extensions 85 in spring pressed sliding contact with the radial faces of the partitions 54 and 56 by springs 86.

Figure 11:
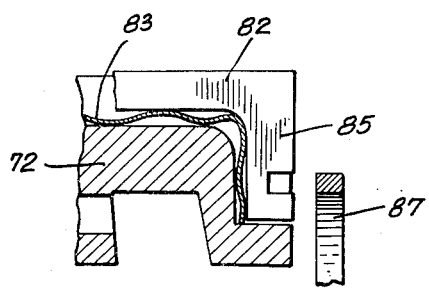
FIGURE 11 is a partial longitudinal section of a satellite rotor of the motor showing the sealing blades.
Figure 12:
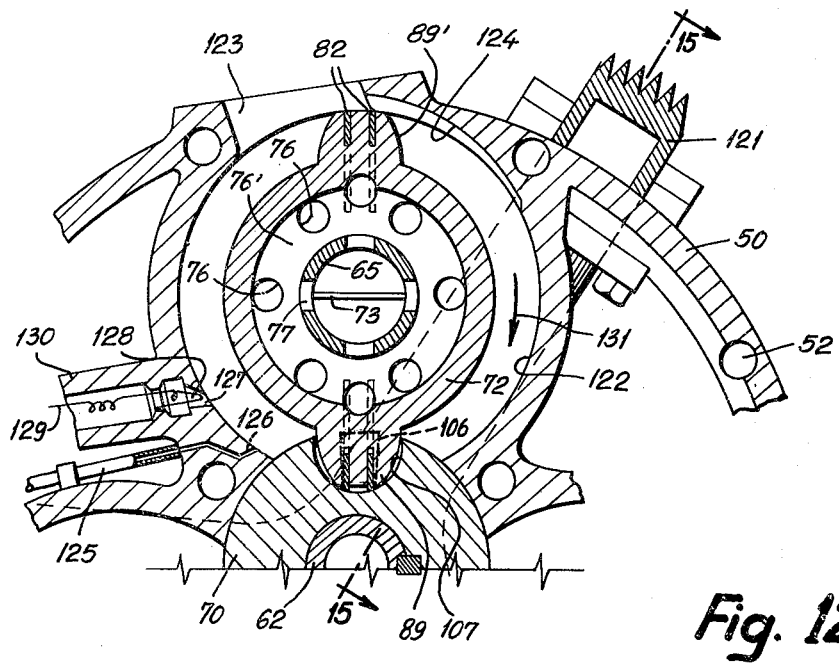
FIGURE 12 is a cross-section along line 12—12 of FIGURE 2b.

The extensions 85 of each sealing blade 82 is provided near its radially inner end with a notch receiving a sealing ring 87 in sliding contact with the radial faces of the partitions 54 and 56 and disposed radially inwardly of the peripheral cylindrical surface 88 of the compressor rotor 71. The same construction for the sealing of the teeth of the motor rotor 72 is used except, as shown in FIGURE 12, that each tooth 89, 89' of the motor rotor 72 is provided with two sealing blades 82. The arrangement of said sealing blades with a sealing ring 87, is shown in FIGURE 11.

Figure 14:
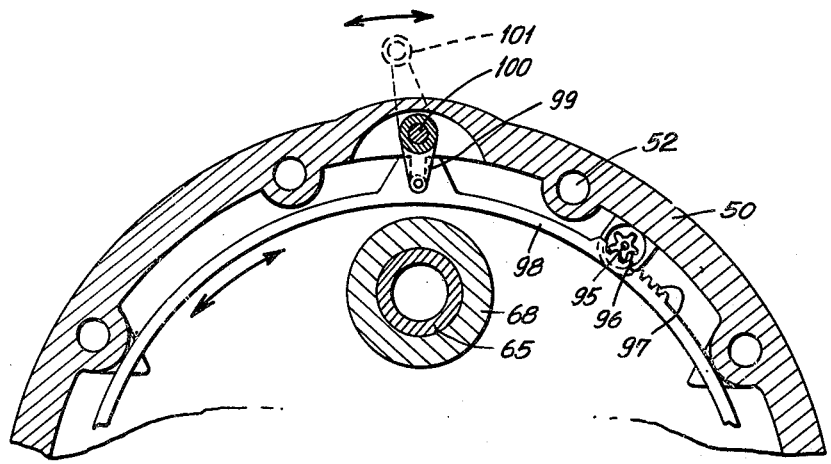

The cylindrical surface 88 of each compressor rotor 71 (FIGURES 2a and 10) is in direct contact with the cylindrical surface 90 of the sealing compressor rotor 69, the latter being common to all the toothed rotors 71 and disposed centrally on the engine. The rotor 69 has two diametrically opposed tooth receiving notches or cavities 91. Each cylinder 81, 81' and 81" is provided adjacent to and upstream from the compressor sealing rotor 69 with an inlet port 92 for the air to be compressed; each inlet port 92 extends the entire length of the compressor unit and opens at its outer end 93 to the atmosphere; the ports 92 are provided with butterfly valves 94 which are simultaneously opened and closed by having their shaft 95 provided with a pinion 96 (see FIGURE 14) meshing with rack teeth 97 formed at three angularly spaced portions of a ring 98 disposed within the gear chamber 55 and rotated by crank 99, manually operated from the outside of the engine through rod 100 and knob 101.

For starting the engine, the butterfly valves 94 are closed whereby air is fed to the compressor rotors 71 through the hollow shafts 65 and passages 79. When the engine has attained a minimum speed, the butterfly valves 94 are opened to feed air directly by inlet ports 92.

Figure 7:
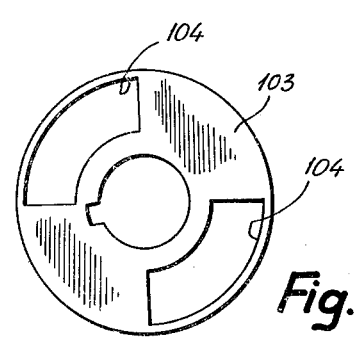
FIGURE 7 is an elevation of the obturating disk for the outlet port of the compressor unit.

Three equally angularly spaced trapezoidal shape discharge ports 102 are made in partition 56 opposite the zone swept by cavities 91 of sealing rotor 69 of the compressor and such that the outer marginal portions of said discharge ports 102 extend radially outwardly of the cylindrical surface 90 of rotor 69, as shown in FIGURE 10. A rotary valve disk 103 (see FIGURE 2a and FIGURE 7) is keyed to central shaft 62 and applied against the outer face of partition 56, said disk having two opposite curved openings 104 adapted to register with discharge ports 102. The angular relationship between openings 104 and notches 91 of rotor 69 is shown in FIGURE 10, the openings 104 being shown in dotted line. The trailing ends of the openings 104 correspond with the notches 91, and openings 104 extend upstream to adjacent the next discharge port 102 when a tooth 80 fully engages a notch 91 opposite the trailing end of the associated opening 104.

The compressor unit operates as follows:

Referring to FIGURE 10 and cylinder 81, air is sucked into the cylinder by passage 79 and later by air inlet port 92, as soon as the tooth 80 leaves the associated notch 91. Upon the next tooth leaving the next notch and passing past the inlet port 92, a predetermined quantity of air is imprisoned between the two diametrical teeth 80. When the leading tooth engages the first notch 91, as shown with reference to cylinder 81, the imprisoned air starts to be compressed by the downstream tooth and is discharged by outlet port 102 upon uncovering of said port by opening 104 of the valve disk 103 (see cylinders 81', or 81"). Thus, referring to cylinder 81', air is discharged first through uncovered marginal area of port 102 and then through the notch 91 and trailing part of opening 104. For each rotation of one toothed rotor, air is sucked and air is compressed and discharged.

Transverse guiding blades 105 are arranged across the inlet ports 92 to guide the sealing blades 82 of the teeth 80 of rotor 71. The cavities 50' formed by the walls of the cylinders 81, 81' and 81" and the housing 50 serve for the circulation of water or air for cooling the compressing unit. This cooling fluid enters similar cavities in the motor unit by passing through bores 52' (see FIGURE 13) made in flanged partition 57.

At the start of the engine, air is fed to the cylinders by passages 79 up to about 5,000 r.p.m. and thereafter the butterfly valves 94 are opened. The knob 101 can be automatically controlled by a tachometer device and also by a thermostat so as not to open the butterfly valves until the engine has attained normal operating temperature.

Figure 13:
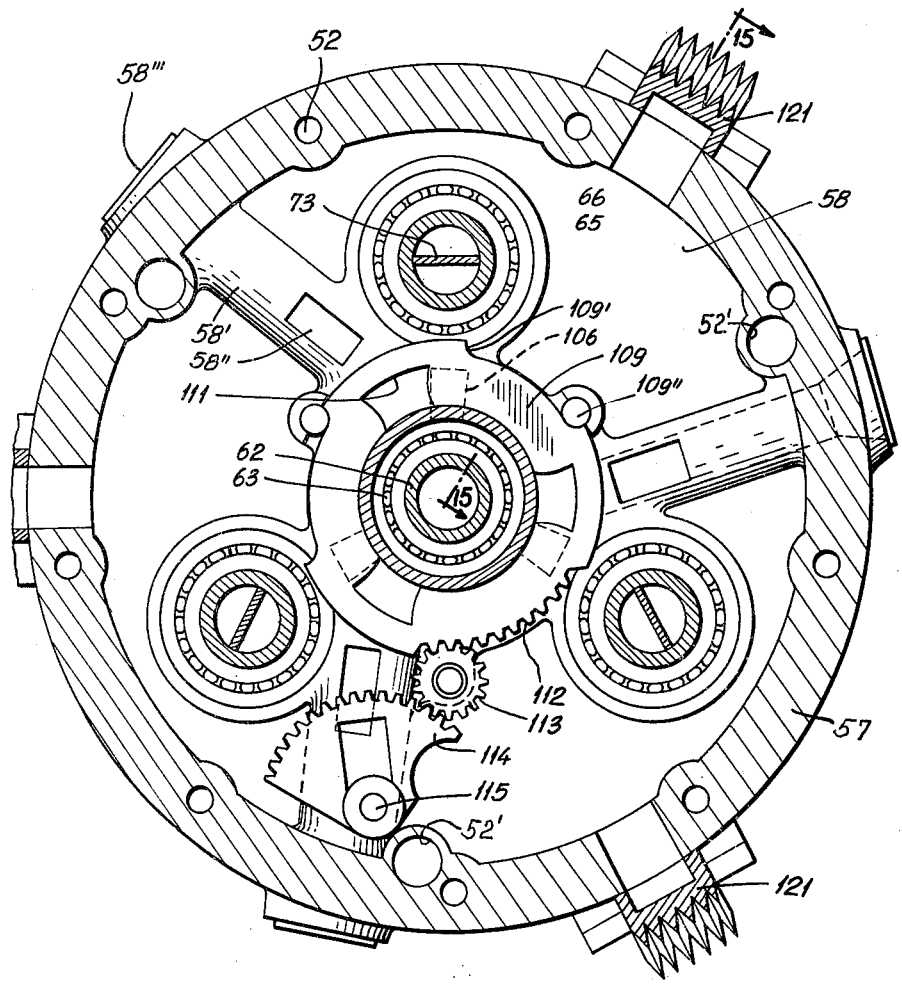

Air is discharged under pressure into the storage chamber 58 between partitions 56 and 57 and is prevented from returning back into the compressor unit due to the presence of the rotary valve disk 103 (see FIGURES 2a and 13).

The flanged partitions 57 and 59 dilimiting the ends of the motor compartment 60 are provided adjacent to and equally angularly spaced around the main shaft 62, with three inlet ports 106 (see FIGURES 12, 13 and 15) of generally trapezoidal shape, and disposed in the path of the cavities or notches 107 which are formed in the sealing rotor 70 of the motor so as to be uncovered thereby; said rotor 70 seals said ports 106 as the tooth 89 of the toothed motor rotor 72 leaves the cavity 107 (see FIGURE 12).

The inlet ports 106 can be closed by the angularly adjustable valve disks 109 and 110 of FIGURES 9 and 8 respectively. The valve disk 109 is positioned within chamber 58 and applied against the front face of the partition 57, it has notches 111 adapted to uncover ports 106, more or less depending on the angular position of the valve disk 109. The latter has rack teeth 112 meshing with a pinion 113 (see FIGURES 2a, 2b and 13) in turn meshing with a tooth sector 114 keyed to a longitudinally extending rod 115 extending outwardly of the engine housing and provided with an actuating crank handle 116. The valve disk 110 illustrated in FIGURE 8 has openings 117 adapted to register and close more or less the inlet ports 106 of the flanged partition 59, said disk is applied against the front face of said partition 59, as shown in FIGURE 2b, and its rack teeth 118 mesh with a pinion 119 intermeshing with a tooth sector 120 keyed to rod 115. The disk 109 has shoulders 109' adapted to abut bosses 109" to limit rotation of the two disks 109 and 110 (see FIGURES 9 and 13).

Figure 15:
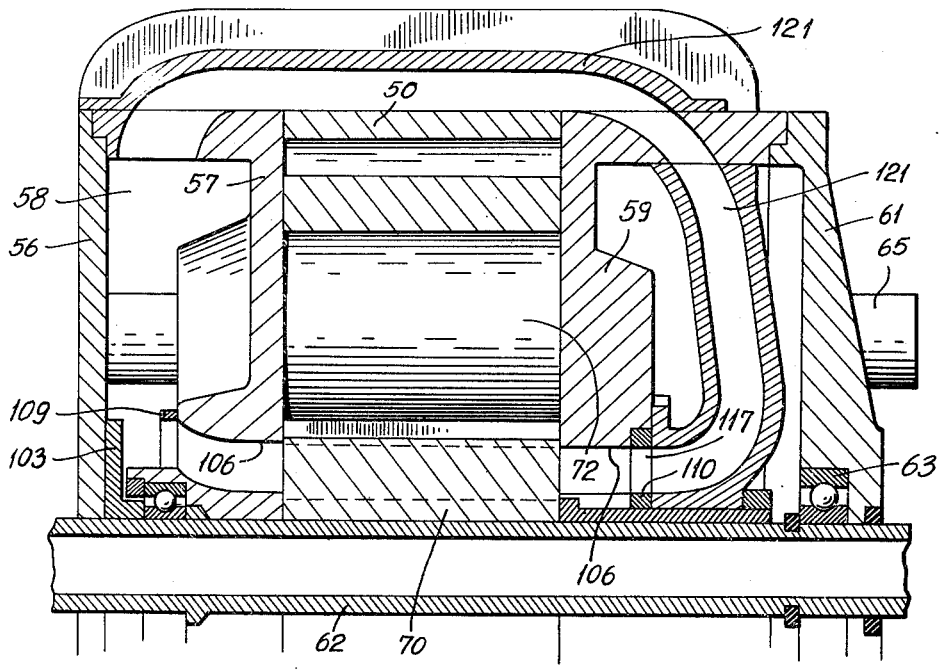
FIGURE 15 is a longitudinal section along line 15—15 of FIGURES 12 and 13.

When starting the engine, the valve disks 109 and 110 are closed and are gradually opened when the pressure in the storage chamber 58 has attained a predetermined minimum. Referring to FIGURE 13, radial reinforcing tubes 58' may be disposed in chamber 58 to reinforce the housing 50. Said tubes 58' may have opening 58" and open to the atmosphere to be connected to tubing whereby the engine may serve as a source of compressed air. However tubes 58' are normally closed by plugs 58'''. Air from the storage chamber 58 is fed to the inlet ports 106 made in the flanged partition 59 at the front end of the engine by means of finned ducts 121, one for each rotor and extending exteriorly of the engine housing, as shown in FIGURES 13 and 15. These ducts are in communication with the outer end of the storage chamber 58 and are bent back at the front to enter the front chamber defined by partition 59 and front cap 61.

Each toothed rotor 72 of the motor unit is enclosed in a cylinder 122 equally angularly spaced around the central sealing rotor 70, as shown in FIGURE 12. Each cylinder 122 has an exhaust port 123 directly opening to the exterior of the housing 50 approximately diametrically opposite from the sealing rotor 70 and having a grooved extension 124 extending upstream with respect to the direction of rotation of the toothed rotor 72 and made in the inner surface of the cylinder 122. Each cylinder 122 is provided with a fuel injection tube 125 opening at 126 into the cylinder immediately upstream from the sealing rotor 70, said tube being connected to a fuel injection pump (not shown) actuated by the main shaft 62 of the engine and arranged to supply a predetermined amount of fuel immediately after a tooth of the toothed rotor passes the tube opening 126 within the cylinder. Downstream from tube opening 126 is arranged a cavity 127 in the cylinder wall, housing an electrical resistance element or glow plug 128 serving as igniting means for the mixture of compressed air and fuel. One terminal of plug 128 is grounded while the other terminal is connected to electric wire 129 which is enclosed in a tube 130 which extends radially and opens at the exterior of the motor housing 50. The resistance 128 is connected to a source of electricity which is only turned on for starting the engine, as when the motor has attained normal speed, the heat developed by the explosions is sufficient to keep the resistance red hot to serve as self igniting means for the motor unit.

The motor unit operates as follows:

Referring to FIGURE 12, with the toothed rotor 72 rotating in accordance with arrow 131 as soon as a tooth 89 starts to leave notch 107, a closed chamber is formed in the notch 107 of sealing rotor 70 on the downstream side of the tooth 89 and said cavity is fed with compressed air from the storage chamber 58 through inlet port 106 registering with said chamber. This chamber is sealed from the downstream zone of the cylinder 122 due to the sealing contact between the cylindrical faces of the two rotors. As tooth 89 passes beyond the fuel injection tube opening 126, fuel is injected within the compressed air and the resultant mixture is ignited by resistance 128 upon passage of tooth 89 beyond said resistance. Explosion takes place which is confined between the two rotors, the internal wall of the cylinder 122 and the trailing face of the tooth 89. Expansion takes place driving the motor and compressor units. Meanwhile, the spent combustion gases ahead of tooth 89 are being expelled through exhaust port 123, because tooth 89' has already uncovered said port. The gases are exhausted until tooth 89 passes beyond the upstream end of the extension groove 124. Any remaining combustion gases are again compressed ahead of tooth 89 to be mixed with fresh compressed air fed into cavity or notch 91 of sealing rotor 70.

The three toothed rotors 72 operate in succession, similarly to the rotors of the compressor unit using a common sealing rotor 70. At each rotation of one rotor, there are two explosions taking place. The toothed rotors and sealing rotor rotate at the same peripheral speed and the toothed rotors are each angularly positioned at 60° apart and thus there will be one explosion each 60° of rotation or six explosions per complete rotation of the motor unit. After each explosion, each tooth will have an expansion travel of about 100° before starting exhausting of the spent gases.

Due to the great number of explosions taking place and also to the fact that the motor unit is fed with highly compressed air of up to 300 pounds per square inch, the engine has a very high power output compared to its volume and weight. The engine can be run at as low a speed as 80 r.p.m. to up to 30,000 r.p.m. and more by controlling the amount of air and fuel fed to the motor unit.

Figure 16:
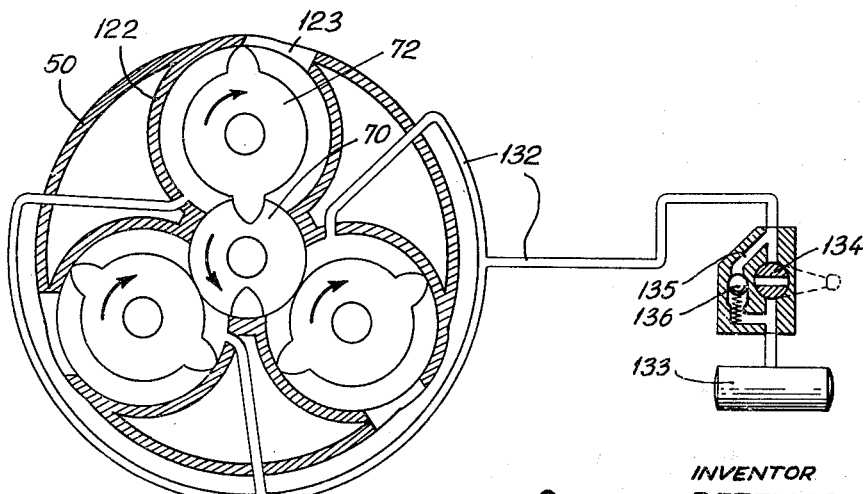
FIGURE 16 is a schematic cross-section of the motor unit provided with a system for starting the engine.

The engine can be started by a starting motor or by the system shown in FIGURE 16. In this figure, which shows a schematic cross-section of the motor unit, piping 132 opens in the cylinders of the toothed rotors 72 upstream from the point of contact of said toothed rotors with the sealing rotor 70, between fuel injection 126 and glow plug 128; said piping 132 is connected to a compressed air bottle 133 with the intermediate of a manually operated cut-off valve 134. To start the engine, the valve disks 109 and 110 of FIGURES 9 and 8, are rotated into closed position and manual valve 134 is opened to thereby feed compressed air into the combustion chambers of the motor unit. This air is mixed with the fuel and ignited. The motor unit starts and operates the compressor to build up air pressure within the storage chamber 58. When the desired pressure is attained, the disk valves 109 and 110 are opened and valve 134 is shut off. However, the bottle 133 can be refilled with compressed gas by piping 132 and by-pass 135 provided with check valve 136. In a modification (not shown), the bottle 133 may be connected directly to the compressor unit, however a bigger bottle would be required.

In the present invention, the compressor unit has a greater displacement volume than the motor unit in order to supply the latter with a sufficient amount of compressed air. Generally, the compressor unit has 1½ times the length of the motor unit for equal rotor diameters.

It should also be noted that, in the present invention, there is, for each unit, only one sealing rotor common to one or more toothed or power rotors thereby improving the power output and simplifying the construction of the engine. Moreover, it is noted that the sealing rotor acts also a valve for the ports in the end walls of the units.

While preferred embodiments in accordance with the present invention have been illustrated and described, it is understood that various modifications may be resorted to without departing from the spirit and scope of the appended claims.

What I claim is:

1. A rotary internal combustion engine comprising a housing defining a central chamber and a plurality of cylindrical chambers exterior to and sidewise abutting and communicating with said central chamber, a cylindrical sealing rotor rotatably mounted in said central chamber and having longitudinally extending cavities made at the surface thereof, a toothed rotor rotatably mounted in each cylindrical exterior chamber, and each provided with two diametrically opposed longitudinally extending teeth in sliding sealing contact with the cylindrical surface of their respective cylinders and adapted to engage in sealing engagement with a cavity of said sealing rotor, the cylindrical surface of said sealing rotor being in direct sealing contact with the cylindrical surfaces of each of said toothed rotors, gear means interconnecting said rotors for rotating the same at equal peripheral speeds, said central chamber having end walls provided with high pressure air inlets, one for each external cylinder and disposed in the path of the cavities of said sealing rotor and on the line joining the axes of said sealing rotor and toothed rotor, each external cylinder having an exhaust gas port made in the cylindrical wall thereof in the zone diametrically opposite said sealing rotor, each external cylinder having a fuel inlet port made therein adjacent said sealing rotor and angularly displaced in the direction of the toothed rotor rotation from the associated air inlet port, for the admission of fuel under pressure into said exterior cylinder, each exterior cylinder having combustible mixture ignition means disposed close to and angularly displaced from said fuel inlet port in the direction of the toothed rotor rotation, whereby air under pressure is fed into said exterior cylinder behind a tooth of said toothed rotor leaving the cavity of said sealing rotor, said air under pressure being confined between said tooth and said sealing rotor and being fed with fuel upon passage of said tooth past said fuel inlet port and the resulting combustible mixture is ignited when said tooth passes beyond said ignition means, the spent combustion gases in front of said tooth being discharged through said exhaust port during feeding of said air under pressure, injection of said fuel and igniting of the combustible mixture behind said tooth.

2. A rotary internal combustion engine as claimed in claim 1, wherein there is an air inlet port in both end walls of said central chamber to feed compressed air from both ends of said chamber through said cavity of said sealing rotor.

3. A rotary internal combustion engine as claimed in claim 1, wherein said exhaust port subtends a substantial angle in the plane of rotation of said toothed rotor.

4. A rotary internal combustion engine as claimed in claim 1, wherein said ignition means consist of a glow plug.

References Cited by the Examiner

UNITED STATES PATENTS

| | | | |
|---|---|---|---|
| 597,709 | 1/98 | Chaudun. | |
| 894,492 | 7/08 | Fulton | 123—13 |
| 926,641 | 1/09 | Coffey et al. | 123—13 |
| 1,095,190 | 5/14 | Cummins | 123—13 |
| 1,287,268 | 12/18 | Edwards | 123—8 |
| 1,440,451 | 1/23 | Ford | 123—8 |
| 1,799,294 | 4/31 | Gough | 123—8 |
| 1,846,298 | 2/32 | Alcznauer | 123—8 |
| 1,923,500 | 8/33 | Northey | 123—8 |
| 1,933,442 | 10/33 | Maxwell et al. | 123—13 X |
| 1,949,723 | 3/34 | Kotelvtseff | 123—13 X |
| 2,018,391 | 10/35 | Whitfield | 123—13 X |
| 2,256,264 | 9/41 | MacKay | 123—8 |
| 2,273,754 | 2/42 | Hand. | |
| 2,580,006 | 12/51 | Densham | 240—141 X |
| 2,656,972 | 10/53 | Rathman | 230—143 X |
| 2,722,201 | 11/55 | Muse | 123—8 |

FOREIGN PATENTS

| | | |
|---|---|---|
| 419,901 | 11/10 | France. |
| 816,426 | 4/37 | France. |
| 134,073 | 10/19 | Great Britain. |
| 316,670 | 1931 | Great Britain. |
| 281,478 | 1/31 | Italy. |
| 45,545 | 10/08 | Switzerland. |

SAMUEL LEVINE, *Primary Examiner.*

KARL J. ALBRECHT, RALPH H. BRAUNER, JOSEPH H. BRANSON, JR., *Examiners.*